United States Patent
Treibach-Heck et al.

(10) Patent No.: US 7,296,221 B1
(45) Date of Patent: Nov. 13, 2007

(54) SYSTEM AND METHOD FOR REMOTE, AUTOMATIC REPORTING AND VERIFICATION OF FORMS

(75) Inventors: Varda Treibach-Heck, Redwood City, CA (US); John J. Hagen, Jr., San Mateo, CA (US)

(73) Assignee: Call-Tell LLC, Redwood City, CA (US)

( * ) Notice: Subject to any disclaimer, the term of this patent is extended or adjusted under 35 U.S.C. 154(b) by 464 days.

(21) Appl. No.: 10/822,232

(22) Filed: Apr. 8, 2004

Related U.S. Application Data

(63) Continuation-in-part of application No. 10/003,339, filed on Oct. 31, 2001.

(51) Int. Cl.
*G06F 15/00* (2006.01)

(52) U.S. Cl. ............. 715/507; 715/505; 715/506; 709/225

(58) Field of Classification Search ........... 715/507, 715/505, 506; 705/1, 11; 395/149; 714/25
See application file for complete search history.

(56) References Cited

U.S. PATENT DOCUMENTS 6,192,380 B1 * 2/2001 Light et al. ............. 715/505
6,589,290 B1 * 7/2003 Maxwell et al. ............. 715/507
2001/0016856 A1 * 8/2001 Tsuji et al. ................. 707/505
2003/0033226 A1 * 2/2003 Anderson .................... 705/32
2003/0110413 A1 * 6/2003 Bernklau-Halvor .......... 714/25

OTHER PUBLICATIONS

Dr. Thieke et al. "Payroll Made Easy: Developing a Web Based System for Student Employee Payroll" pp. 298-302, 2000 US.*

* cited by examiner

*Primary Examiner*—Doug Hutton
*Assistant Examiner*—Tran A. Quoc
(74) *Attorney, Agent, or Firm*—Jeffrey Pearce

(57) ABSTRACT

An originator accesses a client system to select a form, then enters data to be associated with a particular instance of the form. When the originator requests printing of the partially completed form, the print command is intercepted by a driver in the client system, which communicates with a form-processing application in the center, which assigns a unique identifier to the form and associates the identifier with the form in a data base. The form is then printed for the originator, who sends the form to a user. The user completes the form, including markings such as a signature or handwritten information and returns it to the center. After extracting the identifier from the returned form and verifying the form, the center automatically routes and/or indexes and/or forwards the image of the form to the proper location(s), and may also automatically enter the extracted data, properly indexed, into a data base.

16 Claims, 6 Drawing Sheets

HOMEWORK
FAX TO: 1-650-555-1212

100000004081

Student Name  Sunniva Pearce
Student ID#  20010923
Email  sun@shine.xy    Course no. CALC102
Company Reportee   Day Phone  425-555-1212

Completely Shade (■)
No. of Pages Faxed in:
[10] [20] [30] [40] [50] [60] [70]
[1] [2] [3] [4] [5] [6] [7] [8] [9]

Assignment Title: Home Work 3

Special Instructions:

100000004081

SYSTEM AND METHOD FOR REMOTE, AUTOMATIC REPORTING AND VERIFICATION OF FORMS

CROSS-REFERENCE TO RELATED APPLICATIONS

This application is a continuation-in-part of and claims priority of pending U.S. patent application Ser. No. 10/003,339, filed 31 Oct. 2001.

BACKGROUND OF THE INVENTION

1. Field of the Invention

This invention relates to a system and a method for reporting and tracking one or more parameters such as time or sales, or for placing orders, etc., especially where the person or organization that creates the report or order is remote from the person or organization that is to receive and process the report or order.

2. Description of the Related Art

Much of one's work life is tracked and measured. Time cards, time sheets, time clocks and time-tracking software, for example, are features of the modern workplace that are seemingly as unavoidable as the hierarchies that require them. Consequently, following a routine repeated daily by millions in almost every industrialized country, those whose time is to be reported complete a report such as some type of card or sheet or physical or on-screen form. The report is then passed to one or more other people, such as a payroll or billing clerk, a project manager, etc. The data on the report is then usually entered manually into some type of bookkeeping or similar tracking software.

This conventional process is, however, as rife with possibilities for error as it is widespread. For example, every time someone must enter information, be it numerical or textual or both, manually onto paper, there is the possibility of error, since someone else will usually later have to read and interpret what has been written. The likelihood of error is often lessened when using time cards that are punched by machine, but even then the chance of error is not eliminated, because as soon as the data on the card is entered manually into a tracking system, there is a risk of misinterpretation or simply just typing errors. Moreover, even if everyone in the chain of reporting were infallible, the process itself contains an unavoidable inefficiency whenever reported data must be reentered into a tracking system—the very need for data reentry requires both time and an employee to do the reentry.

One way to reduce the need for data reentry would of course be to have the employee enter data himself into the tracking system. The disadvantages of this are, however, plain. First, the employee may not be comfortable with or competent in using the time-tracking software, especially if the software is based on a web browser. Second, even assuming that every reporting employee has convenient access to a suitable computer terminal, it would be wasteful to load multiple copies of the time-tracking software into each terminal.

Because the modern world is full of reports and orders, the problems identified above in the context of reporting time arise in other contexts as well, where other parameters than time must be reported instead of, or in addition to, time. For example, employees must often file expense and travel reports, or sales reports.

Moreover, parameters such as time and expenses are not the only types of information that frequently need to be reported. Employees or affiliates may need to file reports concerning the progress of projects, or the status of inventory, for example, or vendors may wish to send bills quickly in order to speed up the payment process.

Furthermore, similar problems occur even in contexts where the one reporting information is not in any way associated with the recipient of the report. This will often occur in the case of processing of customer orders. As is well known, one option offered by today's technology is on-line ordering via the Internet. However, not all companies have, or wish to have, a web site, and not all potential customers are comfortable with the thought of placing orders over such an insecure channel. Moreover, high-tech, on-line ordering and order processing are not always appropriate. For example, it would in most cases be too time-consuming and tedious to expect several co-workers in an office to have to go on-line and fill in browser-based forms simply to place advanced orders for lunch at one of their favorite restaurants.

Forms are also ubiquitous in many other areas of modern life, both professional and personal. Insurance forms, application forms, medical forms, order forms, tax forms—the list at times seems endless. Many such forms require a physical signature, or some other marking or entry that the user (applicant, etc.) must add manually. One way to submit such a form is for the user to obtain a paper copy, fill it in, then send it to the organization that processes it. Alternatively, the user can fill in the form partially on-line, then print it out and sign it, then mail it in. As yet another alternative, the recipient organization can send the user a partially (or fully) completed form, which the end user can complete, sign (for example) and return.

Once such a form is returned to the processing entity, not only is the problem of fault-prone manual data entry usually present, but many errors are also made in simple routing of the form to the correct processing department, and, once there, errors are often made in indexing the received form, that is, in entering it in the appropriate place in a storage system, data base, etc. For example, even when a practitioner completes a USPTO-designed form on the Patent Office's own web site, prints it out, signs it, and mails it to the USPTO, it still happens that the form is incorrectly routed or lost, even when the form has the correct application serial number and even customer number—that almost every submission to the USPTO is accompanied by a return-receipt confirmation postcard is witness to this problem, which is common in all large organizations that handle exceptionally large amounts of paper submissions. People are human, and make mistakes.

Three form-processing scenarios recur frequently in businesses or functions such as insurance, law accounting, banking, credit checking, government agencies, medical, human resources, sales, etc.:

Forms are filled out on-line, for example, via the Internet, and are then downloaded and printed, signed and faxed for processing. All the electronic data that was originally put into the web application is not saved and the data is entered manually after it is received for faxing.

Forms are filled out in-house on a proprietary system and are then printed and sent out for signatures. Insurance companies frequently follow this scenario. When the document is returned signed, it is manually scanned and indexed for storage and manually routed for business processes such as accounting.

Forms are filled out by one entity, printed and signed and faxed to another entity and then keyed into the receiving entity's database, so electronic data becomes paper and then has to be re-keyed to become electronic.

What is needed is therefore a system for reporting or submitting information such as time worked, expenses, inventory, orders, applications, homework assignments, etc., that is easy to use, that does not require the user to have specialized technology available, that allows for easy verification, that eliminates the need for manual data reentry, and that is readily adaptable to many different reporting contexts. Additionally, the system should reduce the likelihood of errors in routing and indexing reported information, and speed up these processes. This invention provides such a system, and a related method of operation.

SUMMARY OF THE INVENTION

The invention provides a method, and a corresponding system implementation, for collecting reports, such as time sheets, expense reports, order forms, etc., of at least one parameter, such as time, expenses, order information, and so on. A central server is included for automatically receiving from any of a plurality of senders, via a transmission channel, an electronic representation of an image of a physical form. The form has a plurality of data fields, each corresponding to an indicator of at least a partial value of at least one of the parameters. Software modules are included within a form-processing application for automatically identifying the location of the data fields in the received representation of the image of the form; for automatically extracting from the identified data fields the at least partial values of the corresponding parameters; and for automatically storing the extracted values in a predetermined format in a memory for subsequent processing.

A sender, for example a reporting employee or ordering customer, preferably causes the electronic representation of the image of the physical form to be generated by using a conventional facsimile machine to transmit the report form. This allows the transmission channel to be a standard telephone line.

The stored, extracted values of the reported parameters may also be transferred to an external recipient via a network. All processing of the physical form after transmission by the sender up to and including transfer to the external recipient via the network thereby takes place automatically; this avoids all need for manual data reentry and other intermediate manual processing.

Each data field in the report preferably indicates a quantifiable or itemizable value of a corresponding one of the parameters. Nonetheless, other non-quantifiable and non-itemizable entries such as a signature may also be included on reports. In this case, the central server preferably also stores the received electronic representation of the image of the physical form in the memory so that even the non-quantifiable and non-itemizable entries by the user onto the physical form are made available for subsequent review.

The form-processing application preferably also includes a software module that receives annotations from intended recipients of the form and stores these annotations in the memory along with the stored extracted values of the respective received form.

The form processing application preferably identifies the location of the data fields automatically by performing the following sub-steps: storing an electronic representation of a template of each of a plurality of physical forms; automatically identifying each received form by performing a best-fit comparison of each received electronic representation of the image of the corresponding physical form with the stored electronic representations of the templates; automatically registering the received electronic representation of the received physical form image with the best-fit electronic template representation; and matching the data fields in the received electronic representation of the received physical form image with corresponding data fields in the best-fit electronic template representation.

In some embodiments of the invention, an originator accesses a client system to select a form or form template, then enters certain data that is to be associated with particular instances of the form. When the originator requests printing of the partially completed form, the print command is intercepted by a driver in the client system, which communicates with the form-processing application in the center, which assigns a unique identifier to the form, adjusts it further as necessary, and associates the identifier with the form in a data base. The form—now provided with at least one instance of the identifier—is then printed for the originator, who sends the form—or causes it to be sent—to a user. The user completes the form, including markings (such as a signature or handwritten information) and returns it to the center. After extracting the identifier from the returned form and verifying the form, the center automatically routes and/or indexes and/or forwards the image of the form to the proper location, and may also automatically enter the extracted data, properly indexed, into a data base.

BRIEF DESCRIPTION OF THE DRAWINGS

FIG. 2 illustrates one of the many types of forms that may be used to report information using the invention.

FIG. 3 is an example of a "smart" form that is provided with a unique identifier.

DETAILED DESCRIPTION

Figure 1:
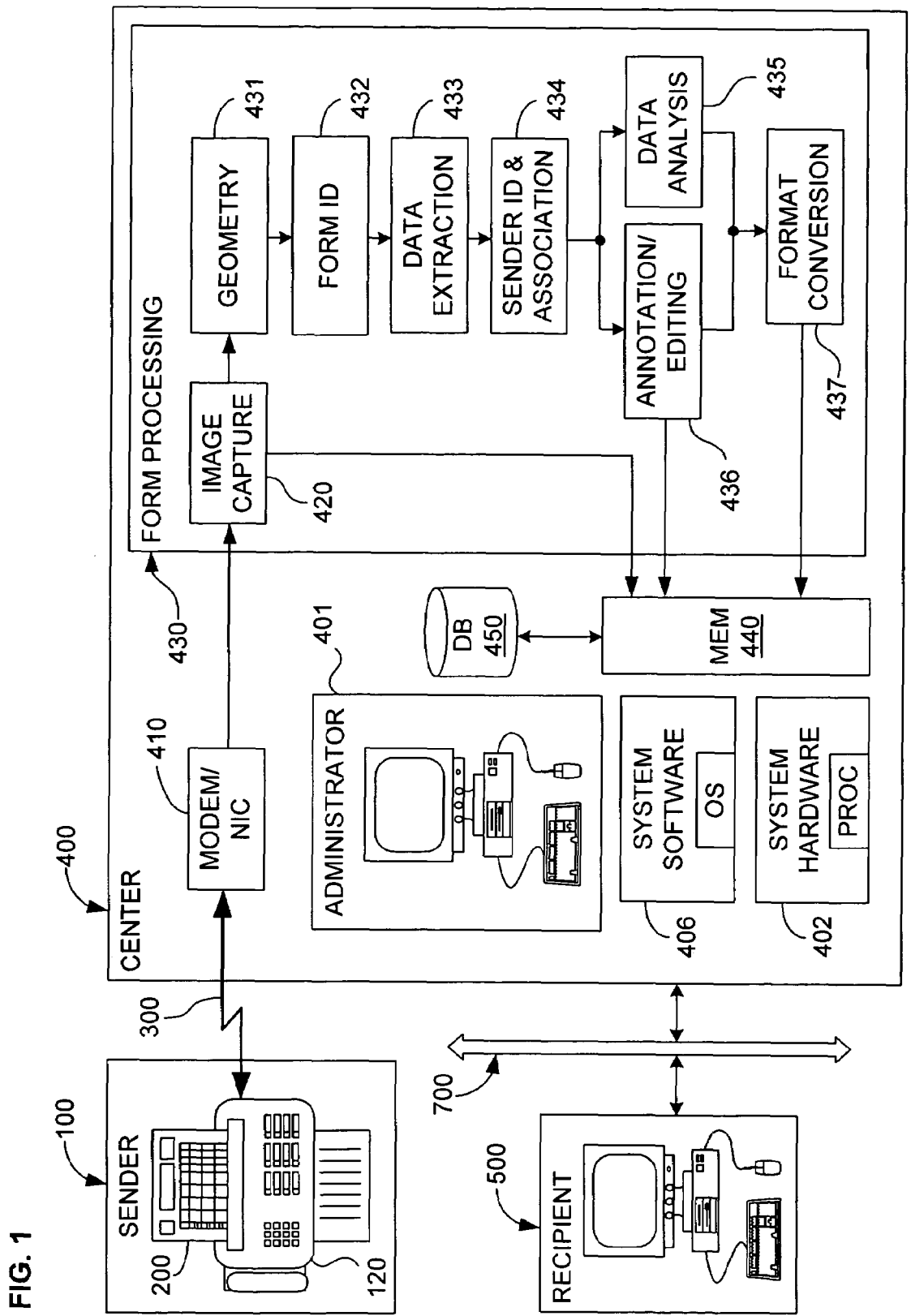
FIG. 1 is a block diagram that illustrates the main hardware and software components of a basic embodiment of the system according to the invention.

FIG. 1 is a block diagram of the main hardware and software components used for data capture from a paper form in a basic embodiment of the invention. In this embodiment, it is assumed that a sender 100 is to transmit some kind of report to a central system 400 ("central server" or simply "center"). The sender does this by recording the information to be reported on a form 200, which is then sent using a transmission device 120, via a channel 300 to the central system 400. Upon receiving the transmitted form, the center then processes it in order to extract the data from the form and, after optional further processing, store it in a storage system, a data base 450, etc. Before the individual hardware and software components of the invention are discussed in greater detail, these terms and concepts are first explained.

The sender 100—also referred to here the user—will be any person or group that needs to report information, submit a form, etc. to either the center 400 or to a client 600 (see embodiment described below). Note that this invention may be used with any number of senders. The sender might be an employee who needs to report time worked, or some other parameter such as travel expenses, a vacation request, sales, inventory, etc. or any combination of such parameters. The sender may, however, also be someone not directly associated with the center, such as a vendor submitting a bill, a customer submitting an order, an applicant submitting an application, etc., in which case the center 400 acts as an intermediary or third party interacting not only with the sender but also with the client 600 (again, see below for multi-party embodiments of the invention).

The transmission device 120 may be a conventional facsimile ("fax") machine. An embodiment of the invention suitable for efficient processing of printed forms sent in a different manner is described below. If the form is to be transmitted electronically at all, there are several advantages to using a fax machine. First, whereas not all workplaces have convenient Internet connections, almost all have at least one fax machine. Second, almost every sender in the modern work environment will be familiar with the use and operation of a fax machine. Third, the channel 300 used by a fax machine is usually the public telephone network, which allows not only for a dedicated, point-to-point connection with the center 400, but also is generally more reliable than a non-dedicated network such as the Internet. Fourth, all modern fax machines provide an easily understood, immediate confirmation of successful transmission or of failure. Fifth, sending fax machines also usually transmit identifying information such as the telephone number from which they are transmitting. This makes it possible for recipients, such as the center 400, to identify the source of a transmission.

It would also be possible, however, to use the invention with other transmission devices than a fax machine and other connections than a telephone line. One possible alternative, for example, would be to use a conventional computer to which a scanner is connected. The sender could then scan in the completed form he wishes to send, then transmit the file in some predefined format to the center, for example as an attachment to electronic mail ("e-mail"), directly as a bit-mapped file using fax-modem software, etc. In this case, the transmission channel 300 could involve a network other than, or in addition to, the telephone system, such as the Internet or a dedicated network (an "intranet") within an enterprise. Note that a fax machine itself embodies a scanner, and as such acts primarily as a combination of a scanner and a modem. All that is required to use the embodiment of the invention shown in FIG. 1 is some device that allows a physical form to be converted into an electronic representation that can be transmitted to the center 400; moreover, the transmission channel 300 may be wired, such as a telephone line, or wireless.

The form 200 may, likewise, be of many different types. In the most common use of the invention, the form will be a conventional paper form (one or more sheets) on which the parameter(s) to be reported is marked in some visible manner, along with optional associated information such as the sender's identification, signature, etc. Each parameter to be reported is preferably amenable to quantification or itemization on a list in order to improve the system's ability to interpret its value correctly and unambiguously. For example, time can be reported in hours and minutes; inventory can be reported by marking an item number and a quantity; orders can be reported by marking a box next to the name of the desired items, along with a quantity; performance can be itemized as "excellent," "good," "acceptable," "unacceptable," etc.

Handwritten or printed comments, on the other hand, or signatures, cannot be itemized or quantified as readily, if at all. As is discussed further below, however, the invention allows such information to be included as well, although it will typically not be processed in the same way as information that can be quantified or itemized.

The sender 100 will usually be remote from the center 400. Note that the term "remote" does not necessarily imply distance, but rather, in the context of this invention, simply that the sender is not able to enter his information, make his application, etc., directly into the center's or client's (see below) system; rather, the form containing the information is either physically sent to the recipient (center or client) for routing and data entry, or is converted into an electronic representation and is transmitted over some channel to the center in some way.

In the simple embodiment of the invention shown in FIG. 1, the center 400 is the recipient of the transmitted form 200. This would be the case, for example, where the center is in the payroll department of a large company and is used to process time sheets sent in by off-site employees. It would also be possible, however, for the center to act as an intermediary for other parties who are the ones primarily interested in the data extracted from the forms transmitted from different users. Extracted data can then be transmitted (according to a known schedule or in response to a request) to the other recipient parties in any conventional manner, for example in the form of a summary, a detailed report, one or more electronic files in a chosen format, etc., or any combination of such methods. For example, FIG. 1 shows one recipient 500, which communicates with the center 400 in any conventional manner via a network 700 such as the Internet. Parties to whom the center-collected data is transferred may then process this data in any way they see fit, from a simple review of a report to a full-scale analysis of the reported parameter (such as time worked) using other applications.

FIG. 1 also shows how the center 400 may be configured as a conventional computer system controlled by a system administrator 401. In some embodiments of the invention, however, the various software modules included in the center 400 are embedded in another system (such as a multi-function printer), such that the administrator 401 will either not be needed at all, or will be external to the center itself.

As in other computer systems, the center 400 includes system hardware 402 with at least one processor (PROC), system software 406, such as an operating system (OS), device drivers, etc., and one or more memory devices 440, which may be any combination of high-speed, volatile devices such as RAM memory and mass storage devices such as disks.

The center also preferably includes a conventional network connection and I/O device 410 such as a modem and/or network interface connector (NIC), depending on the type(s) of transmission channel(s) 300 used to send forms. As is well known, the connection device 410 serves as an interface between the channel 300 and the system hardware and software and transforms a data stream suitable for transmission over the channel into a corresponding data stream that can be processed within the center, and vice versa. The function of a modem and NIC is well known and is therefore not described further here.

In order to convert the transmitted form into data suitable for processing, the center 400 includes an image capture module 420. This module may be implemented with existing technology, and converts the data stream received by the modem/NIC component 410 into a file containing a digital representation of the image of the sent form. Known fax-server software performs this function, for example, by receiving a fax and converting it into an image file in any of several standard formats, such as TIF, GIF, JPEG, HTML, or a standard bit-map. All that is needed according to the invention is for an image of the transmitted form to be generated such that the various data fields of the form can be located and interpreted. As FIG. 1 illustrates, the output from the image capture module 420 is preferably stored directly in the memory 440 for later retrieval of the raw image as received from the sender.

As everyone who has ever received a fax knows, the faxing process often skews and warps the document faxed, and noise and inaccuracies often corrupt the image further. Similar distortions can also occur when printing out a form, for example due to misaligned paper feeds, software incompatibility, etc. In addition, most modern fax machines deliberately compress the transmitted image in order to make room to add a header. A printer may similarly adjust the dimensions and sometimes even aspect ratio of print jobs to fit the paper to be printed on. In essence, a form 200 can be considered to consist of an outer boundary, within which information is made visible in different fields, that is, portions of the form. The faxing or printing process can distort not only the outer boundary, but also the absolute and relative positions of the fields, as well as their shape. Before data can be extracted from the various fields of the form, it is therefore necessary to identify where the fields are.

The form processing module therefore includes a sub-module 431, which determines the geometry of the received form image (or of an actual, submitted form, which may be scanned in using known devices). Any known registration algorithm may be used to perform this function, and there are several commercially available image analysis routines that are suitable for use in the invention. Many algorithms are known, for example, that locate certain predetermined geometric shapes such as rectangles.

Other algorithms are more general, and match a given image with one or more templates. This is the preferred algorithm in the invention, since it does not restrict the layout of the forms as much as simple shape-location routines. Typically, these algorithms compare the test image (in this case, the received image) with a template and then uses known mathematical techniques to find a match that is the "best" in some predetermined sense, which is usually the minimization of an "energy" or "cost" function. For example, if each image (the test image and the template) is represented as a matrix of picture elements ("pixels"), then the pixel matrices can be compared element-by-element, for example, by forming the absolute value of the difference in their gray-scale values. For binary, bit-mapped comparisons, a similar result can be obtained by performing a logical "NOT XOR" operation. The test image and template are then mathematically (usually through changing the indexing) translated, rotated, and, in the most advanced algorithms, warped (similar to a technique known as a "rubber sheet transformation"), relative to each other until the sum of the absolute difference values (either as is or squared) is a minimum.

These algorithms are mathematically similar to holding the form and the template up to a light on top of each other, and then, while looking through both, shifting them until they appear to "line up." In short, the geometry module 431 performs a registration of the received form image with one or more templates, which are pre-stored in memory. In order to aid registration, the forms may be provided with one or more registration markings. The process of registration can then often be speeded up by using the markings as guides. If several markings are provided at different locations over the surface of the forms, with known separations and orientations, then the markings may also be used to compute local "dewarping" factors that can be applied to the pixels in a region near the markings.

In the simplest case, there will be only one template that all transmitted forms correspond to. In some applications of the invention, however, there may be many different types of forms, for each of which there is a corresponding template. One way to determine which template is to be applied is to establish a different telephone number (or network address) for all senders who are using the same form; the telephone number to which the form is sent then also identifies the proper form template. Another, automatic method is to compare each received form image with all the templates, only one of which (presumably, the correct one) will minimize the differences with the form image. Yet another method would be to use the identification feature of modern fax machines: The standard transmission protocol of a fax usually includes the telephone or station numbers of the sending and receiving devices; if specific templates are associated with certain sending devices, then the number of each sending device 120 can be used to select the appropriate template. The form processing module 430 therefore includes a form identification sub-module 432 that implements any known routine, such as those described, to determine which form has been received from a sender. Another sub-module 434 may also be included to identify the sender by means of, for example, the telephone number from which the form was faxed, from an identifier, etc. Note that the form identification sub-module may be eliminated if only one form is ever used, or it may be incorporated into other sub-modules. Moreover, there may be no need for the sub-module 434 if the sender's identify can be determined in a different way, or together with other data analysis, such as through the use of a unique identifier 1010, 1011 described below.

Regardless of the chosen registration and form-identification routines, once the received form image has been registered with a template, the locations of the different data fields will be then also be known. The actual data contained in the different data fields can then be extracted, also using known technology, in a data extraction sub-module 433. Several methods for data extraction are known as "optical character recognition" (OCR), which typically recognizes alphanumeric symbols and converts them into corresponding ASCII (or equivalent) character sets; "intelligent character recognition" (ICR), which typically also attempts to recognize non-standard fonts and even handwriting; "optical mark recognition" (OMR), which determines whether a data field (such as a check box, rectangle, circle, etc.) is filled in or blank; and various combinations and variations of these basic concepts.

Once the data on the form has been located and extracted, it will normally need to be analyzed in one or more ways. The analysis will also often depend on which entity or entities are to be the ultimate recipients of the result of the analysis. For example, if the form is a time sheet, then the analysis may be different for exempt as opposed to non-exempt employees, that is, those for whom overtime must be paid and those who are on a fixed salary regardless of hours worked. Hours worked each day during a pay period will, for example, normally need to be summed, or hours worked for an entire period may need to be associated with different projects. The form processing module therefore includes a data analysis sub-module 435 that is programmed using normal techniques to perform whatever analysis is required in each case.

Depending on the circumstances, it may also be desirable to be able to add notes or otherwise edit the form data. A corresponding processing sub-module 436 may therefore be included to allow this. For example, if an employee is reporting time taken as vacation, and that employee has exceeded his available vacation time, then a notation to this effect may be made in the data file in order to flag this for a manager. One or more parties in addition to the sender (in particular, a recipient 500) may also wish to add notations or comments to form data, in particular, to data once it has already been stored in the memory 440, as is indicated in FIG. 1 by the direct connection between the sub-module 436 and the memory. In such a multi-party embodiment of the invention, parties 500 may contact the center 400 and, after authentication using a password, add notes to the file into which a form is converted. These notes may be textual, but preferably also include notes in the form of attached audio files, for example in the widely used ".wav" format.

As mentioned above, some portions of a form may include fields that are to be completed in a manner, such as by handwriting, that may be difficult or impossible for OCR or ICR software to read, that is, to extract in a form suitable for analysis. The position of such fields on the form will usually be known from the form configuration, however, or they may be associated with automatically extractable text. For example, a survey form, questionnaire, examination form, performance review, etc., usually has a series of numbered questions, with space next to each for handwritten entries. It would be possible for the data-extraction module 433, in cooperation with the geometry module 431 and/or data extraction module 435, to isolate each handwritten comment field and to associate each sub-image with the item it corresponds to. If possible, the handwritten portions could be extracted automatically, or, if not, transcribed and/or summarized, by a human operator, and then stored or reported—per form or per item, or both—for display in any chosen format. For example, buyer comments relating to a particular feature of a product could be isolated as sub-images, along with a header, subject line, or other description, and then forwarded to the department responsible for that feature.

The form annotation sub-module 436 may also serve as or include the routine for adding a unique identifier to the form as described below in conjunction with the discussion of FIGS. 3-6.

Once a form's data has been extracted and analyzed as needed, it will normally need to be stored in a format suitable for later retrieval and further analysis and annotation. Different parties may also request data storage in different formats. One party may, for example, want to be able to retrieve data into a spreadsheet such as Microsoft Excel whereas another may want to retrieve data in Quick-Books format. In order to allow the center to adapt to the needs of external parties, rather than forcing them to accept a formatting decision used in the center, the form processing module 430 according to the invention preferably includes a format conversion sub-module 437 that converts the data from whatever format is chosen to initially represent extracted data (preferably, a generic format) to any of one or more predefined formats before storing the data in memory 440.

Alternatively, all data could be stored in memory in a format chosen to meet the needs or preferences of the center 400, in which case the format conversion sub-module could be invoked to reformat stored data only when it is to be exported to another party. Note that in the case where an external recipient (such as recipient 500 illustrated in FIG. 1) receives form data from the center via the Internet, this means that, once the sender transmits a form 200, preferably via fax, all processing is carried out automatically—with no need for manual data reentry or other human intervention—even to the point of transferring the data via the Internet for subsequent processing.

The sub-modules 431-437 may all be implemented using known programming techniques with conventional hardware support as needed in any given application.

Figure 2:
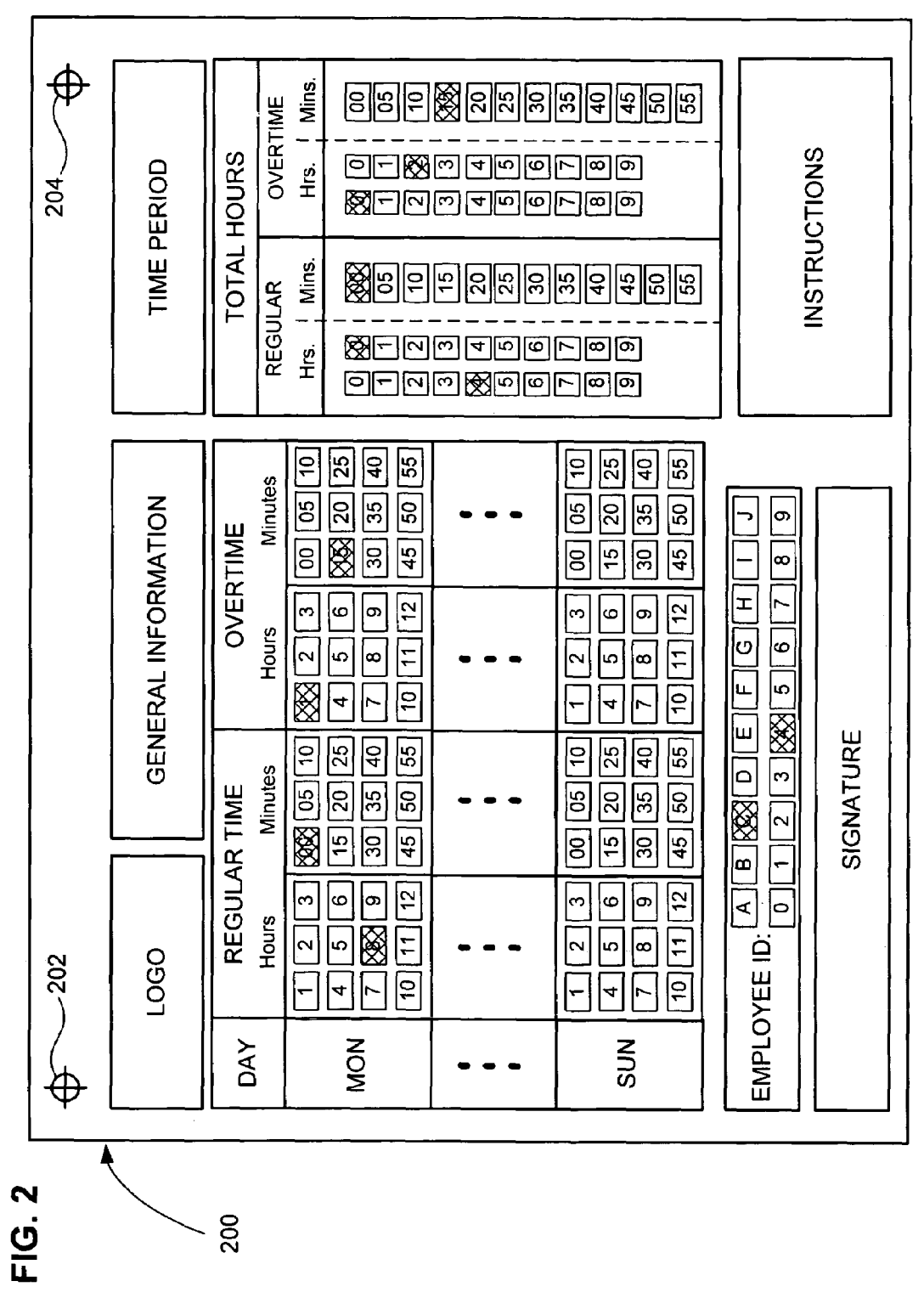

FIG. 2 illustrates one example of a possible form that could be used in the invention. In practice, of course, each user of the system will usually have unique requirements and specifications for the form(s) they will use. The invention is able to accommodate any forms that, as is mentioned above, have data fields in which possible values of parameters to be reported can be quantified or itemized.

The form example shown in FIG. 2, however, resembles in structure a form used successfully in tests of the invention, in that it allowed for accurate data extraction when transmitted from several different conventional fax machines. As the various headings indicate, this example form is set up to enable reporting of time worked over the course of a seven-day week. In this example, hours worked each day are indicated on a row of entry fields, with columns for the day, as well as for the parameters "Regular Time" and "Overtime." For the sake of clarity, the data entry rows and columns are shown larger than they were on the test form. Moreover, the rows for data entry for the days Tuesday through Saturday have been omitted from FIG. 2, because of space constraints and again for the sake of clarity. The actual layout of the form will depend on the needs of the users; the invention does not require any particular layout or headings. Note, moreover, that a form may consist of more than one page.

The illustrated form includes several fields that are preferably pre-printed when the form is delivered to the sender (for example, at the beginning of a pay period for which he is to report time worked). Examples of such fields are fields for a logo, general information and instructions.

A field is also shown for the sender's signature. This will of course usually not be readable by any recognition software, but this is not necessary according to the invention. Rather, recall that an image of the sent form is preferably stored as is in the memory 440. If a user (either the administrator 401, or an external party such as a payroll clerk or manager at the sender's employer, etc.) later wishes to verify that the form was properly signed, then the user will be able to retrieve not only the analyzed data file, but also the original image, on which the signature will appear. This is of course also the case for any other visible feature of the form.

When using the illustrated form, the sender enters data by darkening small data "boxes," each of which is a corresponding data field. Thus, any amount of time can be indicated, in five minute increments, by darkening the appropriate boxes, for example, using a pencil or suitable pen or marker. The sender similarly indicates such information as what his employee ID number is. In FIG. 2, the sender has thus marked that he is employee C4 and that, on Monday, he worked exactly eight regular hours and one hour fifteen minutes of overtime. His weekly total was 40 regular hours and two hours fifteen minutes of overtime.

The illustrated form also shows a block "Time Period." This may be preprinted, or it, too, may be designed with data boxes that the sender can darken; this would allow copies of a single form to be used over many time periods.

The form shown in FIG. 2 also illustrates how registration marks, such as marks 202, 204, may be included on the form as aides to image registration and location of the data entry fields, that is, the data boxes.

One or more other fields may also be included to identify the form and perhaps even the entity (for example, employer) associated with the report; for example, when the form is created and delivered to the user, a bar or other standard code that is easily decipherable by software could be included in a form field to aid form identification, routing, indexing, etc. An embodiment of the invention particularly well suited to generate and use such additional markings is described below.

As part of the data extraction process performed by the sub-module 433, for example, the optical mark recognition, the form processing system according to the invention will sense which boxes the user has darkened. Because the form will have been registered with a template, the darkened boxes can be readily associated with the correct data values for the different parameters to be reported. The data analysis sub-module 435 may then also carry out such computations as calculating the total hours reported as worked, which can then be stored along with the other form data in memory. The calculated total can then be checked against the value the sender himself has entered. If the calculated sum does not match the sum the user entered in the "Total Hours" block, then an annotation to this effect can be made in the stored data file and the administrator can be notified that the form is invalid because of at least one identified error. The sender can then be instructed in any known manner to send a correctly completed form.

Tests have indicated that "boxes" such as those illustrated in FIG. 2, with the values shown within each respective box, were easy to use and understand, and could be recognized by software with very high reliability. Other types of data entry fields may of course be used instead. For entering time, for example, two small clock shapes labeled "hours" and "minutes" could be printed on the form; the sender could then draw hour and minute "hands" in the respective clock figures to indicate time. A single clock figure could be used instead, on which the user draws in both hour and minute "hands"; to aid in the distinction, an inner ring could be included to indicate the proper length of the hour hand, the outer ring of the clock indicating the proper length of the minute hand.

As yet another alternative for entering numerical data such as how many of a particular item the sender wishes to order (or report), the form could include data entry boxes for units, tens, hundreds, etc. Each box could then include light, dotted or dashed lines oriented to correspond to the segments of a conventional seven-segment display. By darkening the appropriate segments, the sender can "print" the numbers in an unambiguous, handwriting-independent manner. Such data entry boxes have been used successfully for many years for automatic optical reading of postal codes on mailed envelopes in several Eastern European countries.

FIG. 3 illustrates one of an almost limitless number of examples of a form 1000 (single- or multi-page) that can be processed and verified by an integrated embodiment of the invention, that is, one in which the unique data-extraction mechanism described above is integrated into a form-generation and processing system, and which includes additional software modules including a data base that further aid such functions as form routing, indexing, and verification.

In the context of this embodiment, a "form" is one or more documents, however created, which, at least one point from the time of generation to final processing, is assumed to be printed or rendered in some form that allows a user to make markings, add text, sign, or the like, in some manner that presupposes intervention and processing by some form of print driver, whether for printing onto paper, to a fax modem, to a document capture routine, etc., and which is intended to be returned to a form originator for ultimate processing. In most cases, a form will also assume the user is to make the markings in some manner that will be, or must be, stored as an image because they cannot be extracted using conventional data-extraction technology such as OCR or ICR. For example, an application that must be physically (as opposed to just digitally) signed and faxed or mailed back, would be a form in this sense.

In other words, a form (which includes the information entered into or on it) in the sense used here involves at least one change of medium or format, such as from an HTML, XML, or similar network (for example, Internet) format to fax, from fax to paper and/or vice versa, from web to paper and/or vice versa, from web to fax modem or document capture format and/or vice versa, etc.

The form illustrated in FIG. 3 is of a type that might be used for distance learning, that is, where students cannot conveniently attend lectures in person, and complete assignments remotely and mail or fax them in to the school. Returned assignments must of course be routed to the correct department and/or instructor. In large universities with centralized document-receiving facilities, such routing can be complicated and error prone.

Many distance learning departments work with handwritten assignments that students submit by fax. This creates a fax-intensive environment that requires much human intervention.

Fax machines that receive student papers at a document center usually prove to be costly (paper, toner, maintenance) and inadequate. For example, during un-staffed peak periods such as weekends, memory gets full and consumables like toner or paper get depleted. The result is often that student transmissions are lost and fax receipts are produced for work that is not received in whole or in part.

Document center staff are responsible for complete on-time delivery of student work as well as archiving, scanning, as well as indexing and storage in a data base. Collation, error handling and problem resolution account for a significant amount of staff focus. What is needed is therefore a scalable, fast and accurate method for processing the document flow between students and professors Note that a similar situation exists in many other organizations, including the Patent Office, which receives thousands of documents each day—almost all of which include signatures—and must route them to the appropriate examining group or department. Even those departments that have their own fax-receiving such forms may also experience the problems of reception failures, especially during unstaffed weekends.

The form 1000 illustrated in FIG. 3 has several parts or "fields," some of which include fixed information, some of which include fields that the form-originating entity will want to complete, some of which include fields that the user must complete, and some of which allow the user to make handwritten entries. As shown, a header ("Homework") is indicated at 1002, a field 1003 is shown with information that will be fixed for all forms of a given type (such as the e originator will normally complete before sending the form to the student (such as the return fax number), area 1004 includes fields that the user will complete using normal data entry, area 1006 has fields that the user will mark, but which may be decoded automatically, and area 1008 is for the user to enter information that cannot or is at least not intended to be extracted automatically, such as handwritten answers, a signature, etc. This form structure is of course simply one example of a useful layout.

As FIG. 3 also illustrates, in this embodiment of the invention at least one instance of a unique identifier 1010 is also added to the form 1000.

As FIG. 3 illustrates, more than one instance of the identifier 1010 is preferably added to the form. As shown, two instances are added, that is, 1011 in addition to 1010. The instances of the identifier are preferably placed and oriented such that too much distortion of the form during transmission will also distort one or more of the instances of the identifier so much that it cannot be automatically read and successfully matched against all others. In other words, failure to decode all identifiers clearly enough will be taken as an indication of a distorted transmission, which will trigger an exception handler so that the form can be routed for manual processing or flagged for some other form of special handling (such as an automatically transmitted request to the user to re-send the transmission).

One suitable placement for two identifiers may be near diagonally opposing corners of the form. In FIG. 3, one of the identifiers is oriented 90 degrees different from the other, which will help detect both longitudinal and lateral distortion; such differing orientations will depend on the ability of the OCR/ICR routines in the data extraction module 433 to read text oriented in different directions, however.

As shown in FIG. 3, each identifier 1010, 1011, is a 12-digit number, by way of example only. As one example of how the identifier could be structured, the first m digits could be used to identify the form type (for example, "homework reporting form"), n other digits could be used to identified the particular form that is completed (here, the form being sent to and returned from student Sunniva Pearce, or, equivalently, from student number 20010923, etc.), and one digit could be used as a check-sum digit, which was generated using a conventional algorithm. In this case, m+n+1=12, but this is of course merely one example.

It would also be possible, for example, to encode in the identifier the date and/or time the form is requested, generated, or printed, or an earliest (or latest) date of validity, etc. This information could then be extracted by the final processor of the form and used for any purpose. For example, failure to receive the form within a certain time could trigger a warning or a notification of a need for renewed transmission, or invalidation of the submitted form. Thus, a user who, online, claims to be submitting a payment immediately along with a print-out of the form, but who does not do so, could be detected.

Given the general form type and the specific form information, the originating and recipient organization (for example, the college to which the student is to fax the form 1000) will know which department to route the form to. After data extraction (for example, using the automatic system described above in connection with FIGS. 1 and 2), or even from the identifier itself (depending on how much information it encodes), the recipient document center will also have all information necessary to create a properly indexed entry in a data base, preferably including an image of the handwritten information. As is described below, this embodiment of the invention makes it possible to fully automate this process, and to do so with a very high rate of verifiable accuracy.

Another way to generate identifiers is simply sequentially—incrementing a set base number each time a new form is generated, for example. As long as it is known what the form is and, optionally, from which entity or person it is to be sent (both of which will typically be known), then even such a number will uniquely identify the form when it returns to the recipient organization.

It is not necessary to use actual numerical digits as the identifiers. Rather, one or more of them could be rendered in some other manner, such as a bar code (linear, 2-D or other), segment codes, dot codes, or even computer-generated "fingerprints."

Any information may be encoded in the identifier 1010, depending on the needs of each use of the invention. One example is mentioned above, namely, encoding in the identifier 1010 a date and/or time "stamp." Additionally, the system can append (or include in) the identifier a page count, or a page number (such that the identifier would be slightly different for each page). This would allow the system according to the invention to identify missing or duplicate pages, to process pages regardless of order received, to ignore and even delete pages known not to be of interest, etc. Lack of a valid identifier could also be interpreted (depending on the application) as a sign that the transmitted form is "junk."

Figure 4:
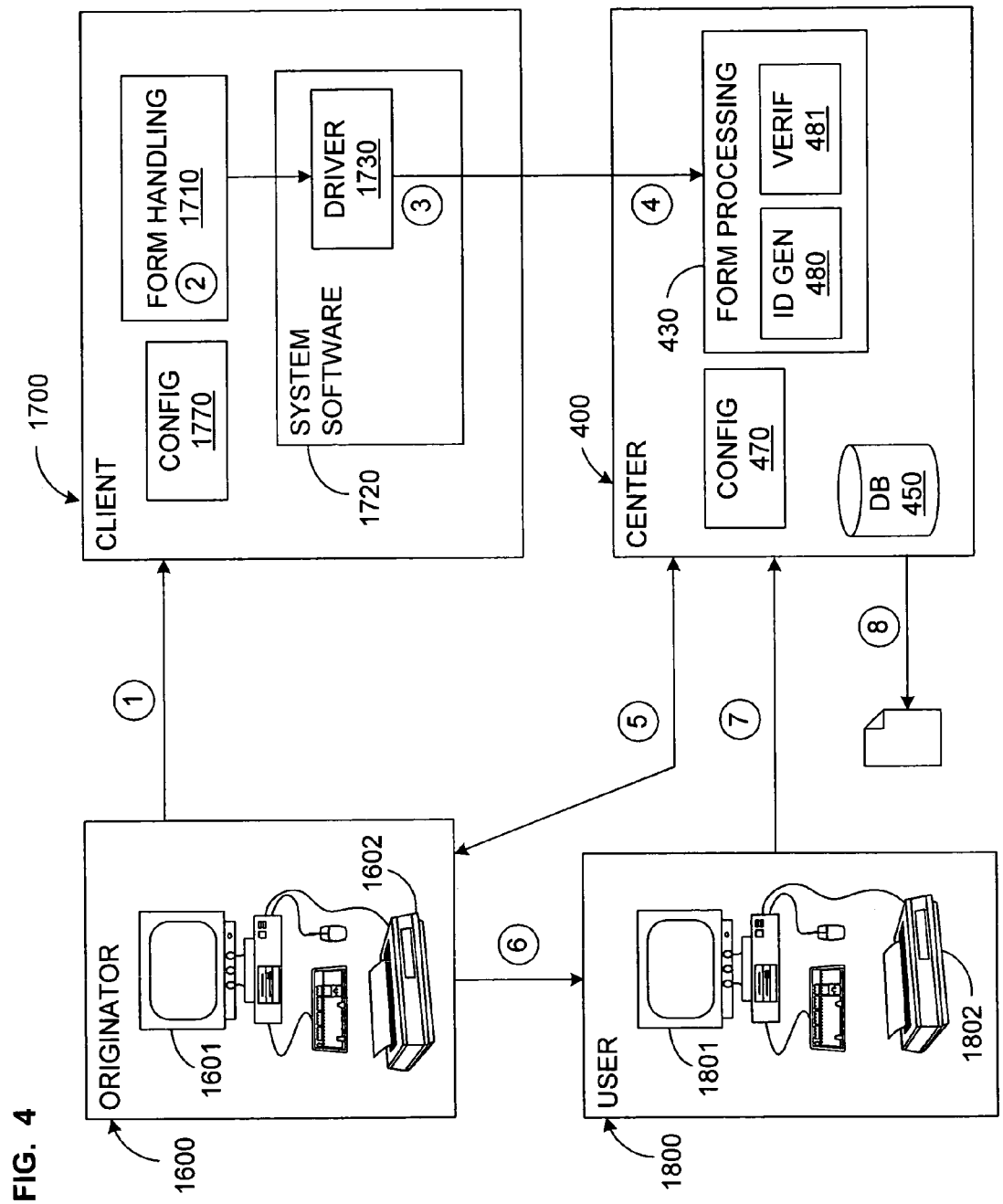
FIGS. 4-6 illustrates embodiments of the invention in which the smart form is created and, after being returned to the center by the user, is automatically verified and routed.
Figure 5:
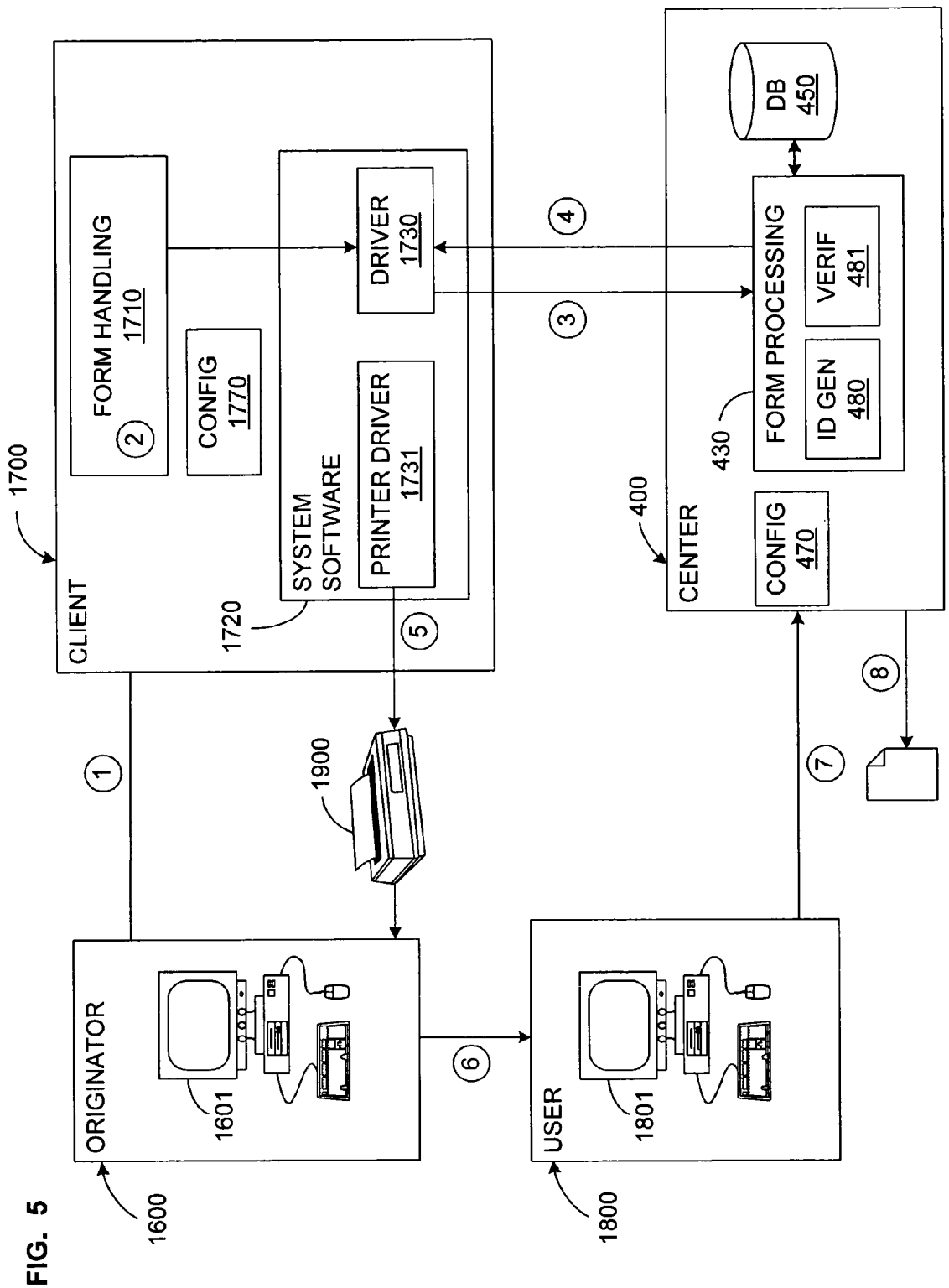
Figure 6:
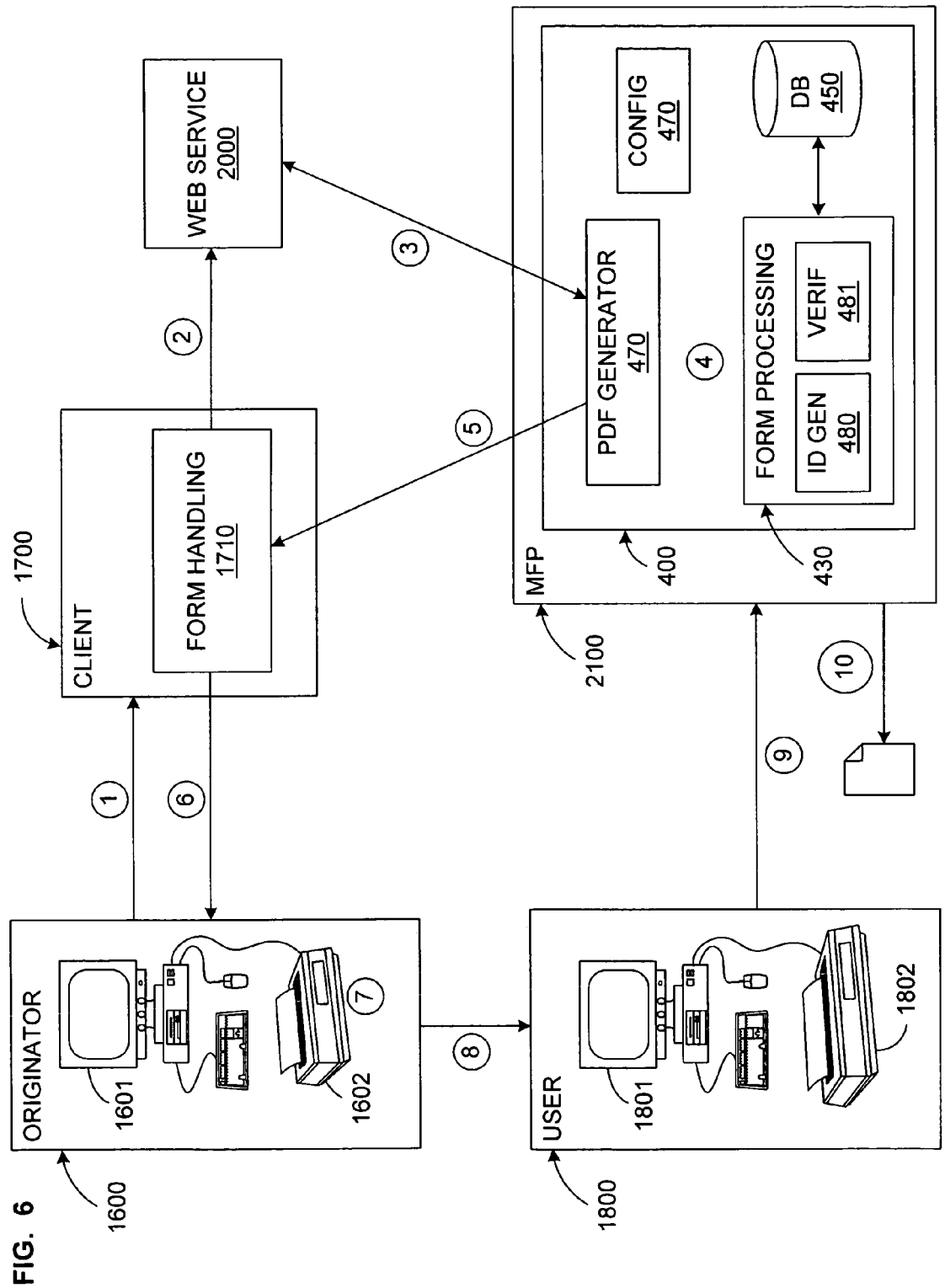

FIGS. 4-6 illustrate embodiments in which the center 400 according to the invention is integrated into a total form-processing system along with a client system 1700 in order to process a form under the direction of or at the request of an originator, working at an originator system 1600, to be completed by a user, working at a user system 1800.

The center 400 may be a conventional server, but it may also be implemented as a body of executable code that is incorporated into the operational program of some other device, such as a multi-function printer.

In FIG. 4, both the originator and user systems are shown as having conventional computers 1601, 1801 and printing devices 1802 (which may alternatively be fax modems, document capture routines, etc., depending on the desired implementation). Note that the originator and user may be the same person/entity, in which case two separate systems will not be necessary.

A form-handling software module 1710, which is preferably but not necessarily at user level is included in the client system 1700 to run on conventional system software (operating system, etc.) in which a driver 1730 is loaded.

A configuration file 470 is included in the center 400 to store information indicating the various routing, indexing, and other information to be applied to forms associated with each originator and/or client. The actual information defining a given transaction's proper configuration will depend on the needs of the parties involved, and can be determined and stored using well known methods. The configuration file 470 will normally be stored in the conventional non-volatile storage device (such as a disk) of the center 400, but will also normally be loaded into memory 440 as needed.

The originator is the person(s) or entity that defines and/or selects the form to be filled out by the user. The client system 1700 will generally be the server through or by means of which the originator creates or selects the form to be sent. The center 400 is the third- or fourth-party entity that enables use of the invention by the other parties. The center may thus be a separate server entity, such as shown in FIGS. 4 and 5, or it may be embedded in a system associated with the client or one of the other parties, as shown in FIG. 6.

Just a couple of the many examples of originator—client—user—form groupings are:

student—college documentation center professor—homework form (FIG. 3)

insurance agent—insurance company server—insurance applicant—application

Note that the originator and the user may be the same. Moreover, there may be other persons or entities involved, with either multiple originators (for example, where more than one person must sign an authorization), multiple users (for example, both a pharmaceutical company and a pharmacy) or both, either in parallel or in series.

The various steps carried out by the originator, the user, or implemented by the computer-executable code that makes up the various software modules of the client and center are indicated numerically in circles in FIGS. 4-6. The operational method implemented by the embodiment of FIG. 4 is as follows:

(1) The originator accesses the form-handling module 1710 of the client in any conventional manner, such as by logging into the client over the Internet, a LAN, a private network, etc. Using known methods, the originator selects the form template of FIG. 3 associated with a particular course. Upon logging in in the usual manner (preferably including entering a user ID and password) the form-handling module 1710 can automatically fill in information, such as name, student ID, etc. from a data base; alternatively, the student could be required to fill this in herself. The originator may then either enter the identifying information about who is to receive and complete the form (the user), if this is not already predetermined; alternatively, the name of a pre-defined (and stored in a data base) group of users (such as all members of a group) could be indicated so that, during later processing, the client can create one form for each member of the group. Printing of documents to group lists is a well understood procedure. The originator then directs the client to print the form(s).

(2) Upon sensing the print command, the client system would normally invoke its standard printer driver and print the form. According to the invention, however, the print command is intercepted, using known techniques, by the driver 1730, which reads the data embedded in the "printed" form with the help of a configuration file 1770, which contains information about the selected form's geometry, data fields, etc. (see above).

(3) The driver 1730 sends the printer information (that is, what is normally passed to the printer driver), as well as all embedded data to the center 400, for example via a network, if the center (or web service, see below) is not local.

(4) After receiving the embedded data from the driver 1730, the form processing module 430 generates the identifier 1010 in an ID-generation module 480, using whatever predetermined algorithm has been chosen, and associates this identifier with the embedded data in an entry (for example, record) in the data base 450. At this point, the identifier will be uniquely associated with the form to be sent to the user.

(5) The form processing module 430 adds the instance(s) of the identifier 1010, 1011 into the print data, so that they will appear on the actual printed form. The form may also be processed in other ways to improve the ability of the form processing module 430 to later extract entered data from it. For example, the form could be normalized by cropping the outside margin against a black border of predetermined dimensions on the outside of the form. Note that the procedure for adjusting a form to be printed (for example, by reformatting an A4 document to print on 8½ by 11 inch paper which maintaining a given aspect ratio), or for augmenting the print file with additional print fields is known, for example when printing standard headers onto faxed documents. The print process requested by the originator is then completed, but now the form will be provided with the identifier 1010, 1011.

(6) The originator then mails, faxes, or otherwise gives the form to the user. One alternative is for the originator to direct the center itself to transmit the form to the user(s); this assumes that suitable address or fax number data is included for the user in the data base 450, but this is easily implemented.

(7) The user completes the form (for example, by adding an annotation such as a grade, an approval signature, etc.) and then sends it back to the center 400.

(8) The center then "reads" (optically extracts) the identifier from the received form using the techniques described above. The center verifies the form, for example using a verification routine 481: Assuming a data field is included that indicates the number of pages sent (such as field 1006 in FIG. 3), the center may immediately check that all pages are included and generate an exception (and/or give some form of notification) if the wrong number of pages have been received. Other exceptions (and notifications) may be generated if the sensed instances of the identifier 1010, 1011 do not match, if a data field for required data is not properly completed or is illegible (to OCR or ICR, etc.), if the form has expired because of being received after some deadline, and so on. If verified (or before), routing and/or indexing information contained in a configuration file 470 is automatically retrieved based on the data base entry associated with the identifier. The center then automatically routes the faxed (or PDF-converted or otherwise electronically rendered) image based on the configured settings and the record data in the data base. Warnings, failure notifications, etc. may also be transmitted using the same routing, or to another predetermined location designated for handling forms flagged as faulty in some sense. Routing may be to a location and even person associated with the form. such as a particular professor, or to any other chosen location, such as a data management center, order processing department, etc.

FIG. 5 illustrates an embodiment in which the invention is integrated with a universal printer driver, and in which the originator prints out the form using a printer 1900 that is attached to a network and is accessible by the originator, the client, and the center. The operational steps of this embodiment are in most respects identical to those described above but are given here for the sake of thoroughness:

(1) As before, the originator accesses the form-handling module 1710 of the client; selects the form template of interest; enters the identifying information about who is to receive and complete the form; and directs the client to print or download the form.

(2) Within the client system 1700, the driver 1730 intercepts the print or download command and reads the data embedded in the "printed" form with the help of the configuration file 1770.

(3) The driver 1730 sends the printer information and all embedded data to the center 400, in particular, to the form processing module. After receiving the embedded data from the driver 1730, the form processing module 430 generates the identifier 1010, and associates the identifier with the embedded data in an entry in the data base 450. The form processing module 430 also adds the instance(s) of the identifier 1010, 1011 into the print data, so that they will appear on the actual printed form. The form may also be processed in the other ways described above.

(4) The center returns to the driver 1730 the print data associated with the adjusted form, in particular, provided with the identifier included.

(5) The driver 1730 passes the augmented print data via the standard printer. driver 1731 to the network printer 1900 to be retrieved by the originator.

(6) The originator then mails, faxes, or otherwise gives the form to the user.

(7) The user completes the form and sends it back to the center 400.

(8) The center then "reads," verifies, and routes the form.

FIG. 6 illustrates an embodiment of the invention in which the client and center communicate via a web service 2000, or any similar system such as EAI (Enterprise Application Integration) solutions that consolidate and coordinate different applications between different entities in a larger information system. A web service is described here by way of example.

Web services are a modular collection of web-protocol based applications that can be mixed and matched to provide business functionality through an internet connection. Web services use standard Internet protocols such as HTTP, XML, and SOAP to provide connectivity and interoperability. According to one definition (Gartner), "Web services are software components that employ one or more of three technologies—SOAP, WSDL and UDDI—to perform distributed computing. Use of any of the basic technologies constitutes Web services. Use of all of them is not required."

According to a slightly different definition web services are a set of XML protocols that simplify the process of exchanging data between disparate systems. With web services, applications are designed around sending documents formatted in XML, rather than wrapping information in complex programming code, as traditional middleware does. When business data stored in documents, such as a purchase order, is thus simplified, design considerations can focus not on technical, low-level building blocks, but rather on business services.

The operational steps of the embodiment of FIG. 6 are in most respects identical to those described above for FIGS. 4 and 5, but are given here for the sake of thoroughness:

(1) As before, the originator accesses the form-handling module 1710 of the client; selects the form template of interest; enters the identifying information about who is to receive and complete the form; and either directs the client to print the form, or selects downloading of the form to his own system for printing.

(2) Within the client system 1700, the driver 1730 intercepts the print (or download) command and reads the data embedded in the "printed" form with the help of the configuration file 1770. The driver then alerts the center 400, which requests the embedded data of the form via the web service 2000

(3) The web service 2000 sends the client data to the center 400, in particular, to the form processing module.

(4) After receiving the embedded data, the form processing module 430 generates the identifier 1010, and associates the identifier with the embedded data in an entry in the data base 450.

(5) A PDF generator 470 embeds the form data (including the identifier 1010) into a file in PDF (or analogous) format and makes it available to the client.

(6) The originator downloads the "smart" form (with identifier and, optionally, cropped, supplied with a margin, etc.) from the client in any known manner.

(7) The originator prints out the form using any printer, such as the printer 1602 connected to his local computer system 1600.

(8) The originator then mails, faxes, or otherwise gives the form to the user.

(9) The user completes the form and sends it back to the center 400.

(10) The center then "reads," verifies, and routes the form.

In FIGS. 4-6, the software component 480 that generates the unique identifier(s) 1010, 1011 is located within the center 400. This is not the only configuration. Rather, this module could be incorporated into the form-handling routine 1710 in the client or in the web service 2000 (or equivalent). This component could even be made part of software included in the originator's system 1600, as long as the assigned number is communicated in some way to the center for proper association with the extracted form data. In short, the identifier 1010 could be generated at any stage of the process from the point at which form data (at least that which is used in generation of the identifier) is extracted to form print-out. Modifications to the configurations described above needed to implement such a relocation of the component 480 will be obvious to skilled programmers.

We claim:

1. A system, including one or more processors and memories, for processing a form completed by a user, comprising:
    an originating system associated with an originator;
    a client system;
    a center system;
    a form-handling software module resident in the client system and comprising computer-executable code for sending a request from the user to the originating system for a requestor-specific form, which is embodied in a first, electronic transmission format, the originating system thereupon transmitting to the client system corresponding, automatically extractable data, along with a command to produce an instance of the requestor-specific form including the automatically extractable data
    an identifier-generating software module resident in the center system comprising computer-executable code for thereupon not only creating the instance of the requestor-specific form but also generating a request-specific, unique identifier uniquely identifying the specific produced instance of the requestor-specific form and for augmenting the instance of the requestor-specific form with the unique, request-specific identifier, said center system thereupon returning to the originating system for onward transmission to the user the request-specific form including not only the automatically extractable data but also the request-specific, unique identifier;
    a form-processing software module resident in the center system and comprising computer-executable code for storing an association of the unique, request-specific identifier with the specific instance of the requestor-specific form, for receiving, via a publicly accessible transmission channel, the specific instance of the requestor-specific form after handling by the user in a second transmission format, which is different from the first transmission format and allows for off-line handling, for comparing the unique, request-specific identifier of the received requestor-specific form against the association, and for automatically routing an image of the received requestor-specific form to a destination indicated in a corresponding entry in a configuration file.

2. A system as in claim 1, in which the request from the user to the originating system for the requestor-specific form includes a command to a standard printer driver within the client system.

3. A system as in claim 1, in which the request from the user to the originating system for the requestor-specific form includes a command to download the form to the originating system over a network.

4. A system as in claim 1, further comprising a coordinating system connected by network to both the client system and the center system for transmitting information identifying the instance of the requestor-specific form to the center system from the client system.

5. A system as in claim 4, in which the coordinating system is a web service.

6. A system as in claim 1, in which the requestor-specific form includes at least one handwritten comment field, the computer system further including computer-executable code for associating the handwritten comment field with a corresponding report item.

7. A system as in claim 6, in which the computer-executable code is further provided for automatically extracting the handwritten comment field as a sub-image and then converting the sub-image into a displayable format.

8. A system as in claim 1, in which the form processing software module is further provided for automatically extracting data from the received requestor-specific form.

9. A system as in claim 8, in which the form processing software module includes a format conversion module comprising computer-executable code for automatically converting the extracted data into any of a plurality of predetermined formats for transmission of the extracted data to a recipient in the format that is associated with that recipient.

10. A system, including one or more processors and memories, for processing a form completed by a user, comprising:
   a client system associated with a user;
   a center system that is separate from the client system;
   a form-handling software module resident in the client system and comprising computer-executable code for sending a request for a requestor-specific form to the center system over a publicly accessible transmission channel;
   a form-processing software module resident within the center system and comprising computer-executable code for sensing the request to produce the requestor-specific form, and thereupon
      for including automatically extractable, requestor-specific data in a specific instance of the requestor-specific form and
      for automatically generating and augmenting the requestor-specific form with a request-specific identifier uniquely identifying the specific instance of the requestor-specific form
      for storing an association of the request-specific identifier with the specific instance of the requestor-specific form,
      for transmitting the specific instance of the requestor-specific form back to the client system in a first, electronic transmission format,
      after requester handling of the specific instance of the request-specific form in a second format that is different form the first format and allows for off-line handling, for receiving the request-specific form back from the client system,
      for comparing the request-specific identifier of the received request-specific form against the association, and
      for automatically routing an image of the received requestor-specific form to a destination indicated by rules that trigger actions based on predefined request-specific conditions.

11. A system as in claim 10, in which the automatic routing of an image of the received form to a destination is indicated by rules that trigger actions based on defined conditions.

12. A system as in claim 10, in which the form-processing module is further provided with computer-executable code for issuing a message to at least one recipient as part of the automatic routing.

13. A system as in claim 10, in which the conditions are also a function of at least one item of the automatically extractable data.

14. A system as in claim 10, in which the conditions include pre-determined conditions.

15. A system as in claim 14, in which the pre-determined conditions are selected from a group consisting of form transmission errors, form reception errors, form completion errors and conditions associated with predetermined routing categories.

16. A system, including one or more processors and memories, for processing a form completed by a user, comprising:
   an originating system;
   a center system;
   a form-handling software module resident in the originating system and comprising computer-executable code for sending a request for a user-specific form to the center system;
   a form-processing software module resident within the center system and comprising computer-executable code
      for sensing the request to produce the user-specific form, and thereupon
      for including automatically extractable, user-specific data in a specific instance of the user-specific form and
      for automatically generating and augmenting the user-specific form with a request-specific identifier uniquely identifying the specific instance of the user-specific form
      for storing an association of the request-specific identifier with the specific instance of the user-specific form,
      for transmitting the specific instance of the user-specific form back to the originating system in a first, electronic transmission format,
      for receiving back the specific instance of the request-specific form after handling by the user in a second transmission format that is different from the first transmission format and allows for off-line handling,
      for comparing the unique request-specific identifier of the received user-specific, user-handled form against the association, and
      for automatically routing an image of the received user-specific, user-handled form to a destination indicated by rules that trigger actions based on predefined request-specific conditions.

* * * * *